United States Patent
Nagabhushana et al.

(10) Patent No.: US 9,016,989 B2
(45) Date of Patent: Apr. 28, 2015

(54) PROTECTIVE CAP FOR A ROTOR BLADE

(71) Applicant: General Electric Company, Schenectady, NY (US)

(72) Inventors: Pradeepa Nagabhushana, Bangalore (IN); Donald Joseph Kasperski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/954,029

(22) Filed: Jul. 30, 2013

(65) Prior Publication Data

US 2015/0037112 A1    Feb. 5, 2015

(51) Int. Cl.
*F03D 11/00* (2006.01)
*B60P 7/02* (2006.01)

(52) U.S. Cl.
CPC ........................................ *B60P 7/02* (2013.01)

(58) Field of Classification Search
CPC ..... Y02E 10/721; Y02E 10/728; Y02E 60/50; B65D 2585/6897; H01M 8/0247; H01M 8/0252; F03D 1/0675; F03D 1/001; F03D 1/005; F05B 2240/302; F05B 2240/30; F05B 2260/02

USPC ........... 410/44, 53, 120, 34, 82, 2, 35, 36, 46, 410/47, 101

See application file for complete search history.

(56) References Cited

U.S. PATENT DOCUMENTS

| | | | |
|---|---|---|---|
| 4,341,494 A * | 7/1982 | Fedele | 410/45 |
| 5,628,403 A * | 5/1997 | Thomas et al. | 206/523 |
| 8,043,066 B2 | 10/2011 | Sambamurty | |
| 8,240,962 B2 | 8/2012 | Livingston et al. | |
| 8,313,272 B2 | 11/2012 | Koike | |
| 2006/0251517 A1 * | 11/2006 | Grabau | 416/202 |
| 2007/0025858 A1 * | 2/2007 | Driver et al. | 416/229 R |
| 2007/0140858 A1 * | 6/2007 | Bakhuis et al. | 416/223 R |
| 2008/0187442 A1 * | 8/2008 | Standish et al. | 416/235 |
| 2012/0034094 A1 | 2/2012 | Wansink | |
| 2012/0134817 A1 | 5/2012 | Bagepalli et al. | |

* cited by examiner

*Primary Examiner* — Glenn Dayoan
*Assistant Examiner* — Sunsurraye Westbrook
(74) *Attorney, Agent, or Firm* — Dority & Manning, P.A.

(57) ABSTRACT

A protective cap for a trailing edge of a rotor blade of a wind turbine for use during transportation, handling, or maintenance of the rotor blade is disclosed. The protective cap includes a body having a first leg, a second leg, and a cap member. The cap member connects the first and second legs. Further, the cap member may be configured to cover at least a portion of a trailing edge of the rotor blade and may be configured to provide a gap between an inner surface of the protective cap and the trailing edge. In addition, the first and second legs may resiliently engage the rotor blade.

20 Claims, 6 Drawing Sheets

PROTECTIVE CAP FOR A ROTOR BLADE

FIELD OF THE INVENTION

The present subject matter relates generally to rotor blades for a wind turbine and, more particularly, to a protective cap for a rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, nacelle, and one or more rotor blades. The rotor blades capture kinetic energy of the wind using known airfoil principles. The rotor blades transmit the kinetic energy in the form of rotational energy so as to turn a shaft coupling the rotor blades directly or indirectly to the generator. The generator then converts the mechanical energy to electrical energy that may be deployed to a utility grid.

The typical configuration of a conventional rotor blade generally includes a blade root, a blade tip, and a blade shell extending between the blade root and blade tip. The blade shell generally defines an aerodynamic airfoil shape of the rotor blade and may be formed from a fiber-reinforced material, such as glass fiber, carbon fiber, or the like. Additionally, the blade shell is typically a composite design, being manufactured from separate shell components which are bonded together. To bond the shell components, a thick layer of adhesive is typically applied to one or both of the shell components. The shell components are then brought into contact with one another (e.g., by placing the shell components on top of each other) to form a thick adhesive bond line around the edge of the blade shell (i.e., the leading and trailing edges of the rotor blade).

After manufacturing of the rotor blades is complete, the blades are transported to a wind turbine site. Various fixtures are used to hold the blades in place during transportation along with protective measures, including, but not limited to, protective caps, cushion pads, and the like. A particularly sensitive area of the rotor blade is the trailing edge due to the relatively sharp edge created by the joint of the pressure and suction sides. As such, conventional systems have employed protective caps made of glass laminates wrapped around the trailing edge and held by straps to avoid transportation and handling damages. Such systems, however, have caused damage to the trailing edge of the rotor blades due to constant rubbing and impact during transportation.

Accordingly, there is a need for an improved trailing edge protective cap for use with a wind turbine rotor blade that reduces blade handling damage.

BRIEF DESCRIPTION OF THE INVENTION

Aspects and advantages of the invention will be set forth in part in the following description, or may be obvious from the description, or may be learned through practice of the invention.

In one aspect, the present subject matter discloses a protective cap for a trailing edge of a rotor blade of a wind turbine for use during transportation, handling, or maintenance of the rotor blade. The protective cap includes a body having a first leg, a second leg, and a cap member. The cap member connects the first leg and the second leg. The cap member may be configured to cover at least a portion of a trailing edge of the rotor blade. Further, the first leg is configured to resiliently engage a suction side of the rotor blade and the second leg is configured to resiliently engage a pressure side of the rotor blade such that the protective cap effectively holds itself on the rotor blade when installed.

In another embodiment, the cap member is configured to provide a gap between an inner surface of the protective cap and the trailing edge of the rotor blade when the protective cap is installed on the rotor blade. In still a further embodiment, the first and second legs may each define respective surface areas covering a portion of the pressure and suction sides of the rotor blade, respectively. Further, the first and second legs may include at least one flange extending substantially perpendicular therefrom.

In another embodiment, the first leg may be configured to correspond to a profile of the suction side of the rotor blade and the second leg may be configured to correspond to a profile of the pressure side of the rotor blade so as to fit closely against the respective suction and pressure sides.

In still further embodiments, the protective cap may include at least one cushion pad between the first leg and the suction side and at least one cushion pad between the second leg and the pressure side. Further, the protective cap may include at least one cushion pad between the cap member and the trailing edge of the rotor blade. In yet another embodiment, the protective cap may extend substantially the span-wise length of the trailing edge. In alternative embodiments, the protective cap may extend only a portion of the span-wise length of the trailing edge. In a further embodiment, the cap member may have a substantially arcuate shape.

In still further embodiments, the protective cap may include at least one fastening component configured to secure the protective cap to the rotor blade. Further, the cap member may include at least one slot configured to receive the fastening component. In various embodiments, the fastening component may include one or more straps, slings, chains or similar. Further, the fastening component may be a separate feature of the protective cap or may be integral with the protective cap.

In another aspect, a protective cap for a trailing edge of a rotor blade of a wind turbine for use during transportation, handling, or maintenance of the rotor blade is disclosed. The protective cap includes a body having a first leg, a second leg, and a cap member. The cap member connects the first leg and the second leg. Further, the cap member is configured to cover at least a portion of the trailing edge. Moreover, the cap member is configured to provide a gap between an inner surface of the protective cap and the trailing edge when the protective cap is installed on the rotor blade. In addition, the first and second legs may be configured to resiliently engage the rotor blade.

In still another aspect, a method for preparing a rotor blade for transportation, handling, or maintenance is disclosed. The method includes installing at least one protective cap on a trailing edge of the rotor blade. The protective cap includes a body having a first leg, a second leg, and a cap member connecting the first and second legs. Further, the cap member provides a gap between an inner surface of the protective cap and the trailing edge. Moreover, the first and second legs resiliently engage the rotor blade. The method further includes securing the protective cap to the rotor blade.

In another embodiment, securing the protective cap to the rotor blade further includes securing at least one fastening component to the protective cap and the rotor blade. Further, the at least one fastening component may be installed within a slot of the protective cap. Additionally, the method may further include installing at least one cushion pad between the first and second legs of the protective cap and the rotor blade.

In still further embodiments, the method may include installing the rotor blade having the installed protective cap within a shipping fixture, the shipping fixture having maximum dimensions equal to or less than maximum dimensions permitted for rail or truck transport.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
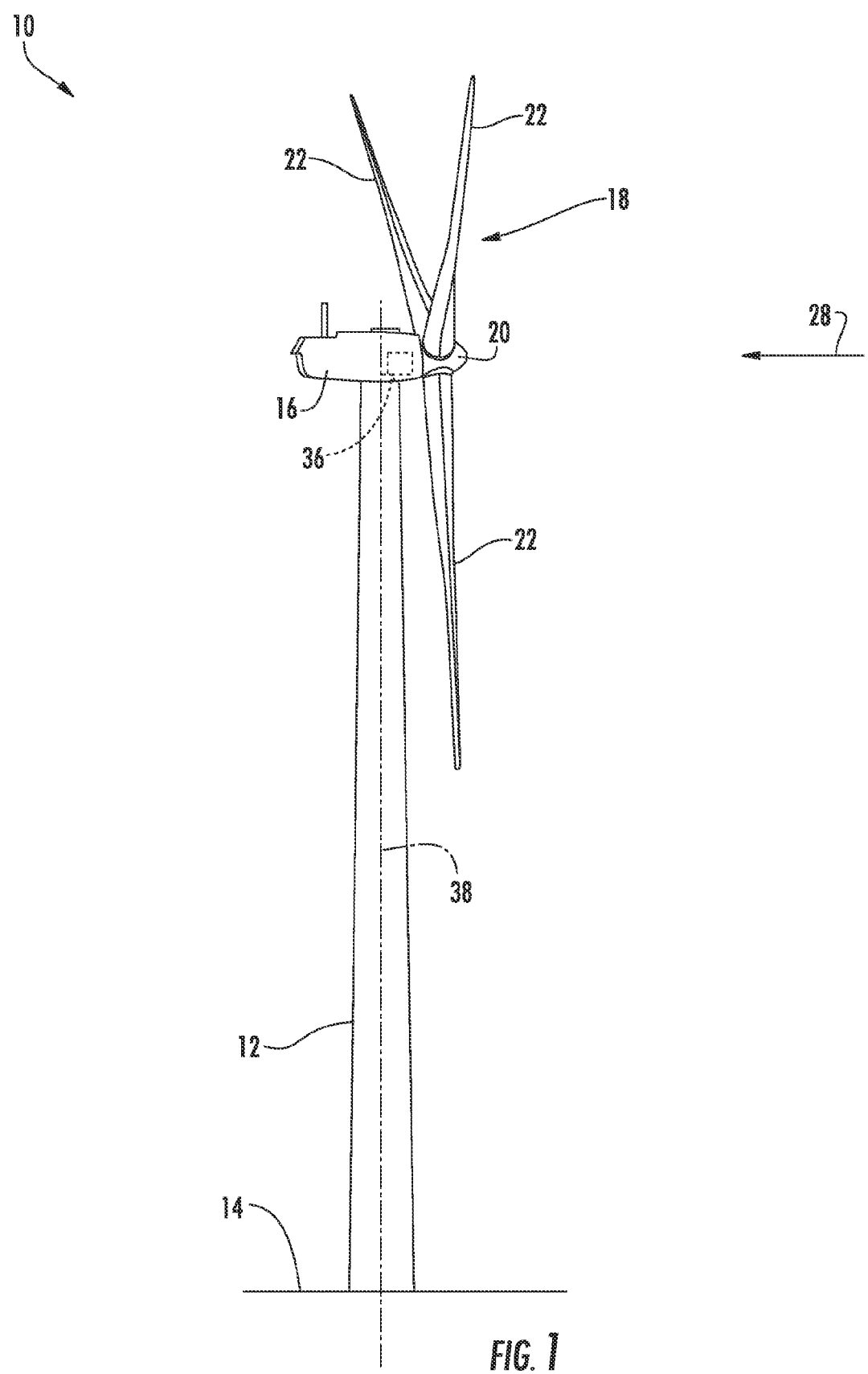
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a protective cap for a trailing edge of a rotor blade of a wind turbine for use during transportation, handling, and/or maintenance of the rotor blade. The protective cap as described herein includes a body having a first leg, a second leg, and a cap member connecting the first and second legs. The cap member is configured to cover at least a portion of the trailing edge and provides a gap between an inner surface of the protective cap and the trailing edge. Further, the protective cap may be formed from a relatively rigid and/or stiff material such that the first and second legs resiliently engage the rotor blade.

As such, it is believed that the protective cap of the present subject matter provides numerous advantages. For example, the rigidity of the protective cap may enhance the stiffness of the protective cap. Additionally, the gap or separation between the inner surface of the protective cap and the rotor blade eliminates contact with the trailing edge of the rotor blade and thereby minimizes damage to the blade caused by rubbing and/or impact during transportation, handling, and/or maintenance. Further, the stiffness in combination with the shape of the protective cap acts like a spring, which effectively holds the protective cap onto the rotor blade. As such, the protective cap offers a simple, easy-to-install design that is not present in the prior art.

Referring to the drawings, FIG. 1 illustrates a perspective view of a wind turbine 10. As shown, the wind turbine 10 is a horizontal-axis wind turbine. However, it should be appreciated that the wind turbine 10 may be a vertical-axis wind turbine. In the illustrated embodiment, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outwardly from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. However, in an alternative embodiment, the tower 12 may be any suitable type of tower known in the art.

The rotor blades 22 may generally have any suitable length that enables the wind turbine 10 to function as described herein. For example, in one embodiment, the rotor blades 22 may have a length ranging from about 15 meters (m) to about 91 m. However, other non-limiting examples of blade lengths may include 10 m or less, 20 m, 37 m or a length that is greater than 91 m. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced.

As shown in the illustrated embodiment, the wind turbine 10 may also include a turbine control system or turbine controller 36 centralized within the nacelle 16. However, it should be appreciated that the controller 36 may be disposed at any location on or in the wind turbine 10, at any location on the support surface 14 or at any other suitable location. Generally, the controller 36 may be configured to control the various operating modes of the wind turbine 10 (e.g., start-up or shut-down sequences). Additionally, the controller 36 may control many of the various components of a wind turbine 10. For example, as the direction 28 of the wind changes, the controller 36 may be configured to control a yaw direction of the nacelle 16 about a yaw axis 38 to position the rotor blades 22 with respect to the direction 28 of the wind. In particular, the controller 36 may control a yaw drive mechanism (not illustrated) of the nacelle 16 in order to rotate the nacelle 16 about the yaw axis 38.

Figure 2:
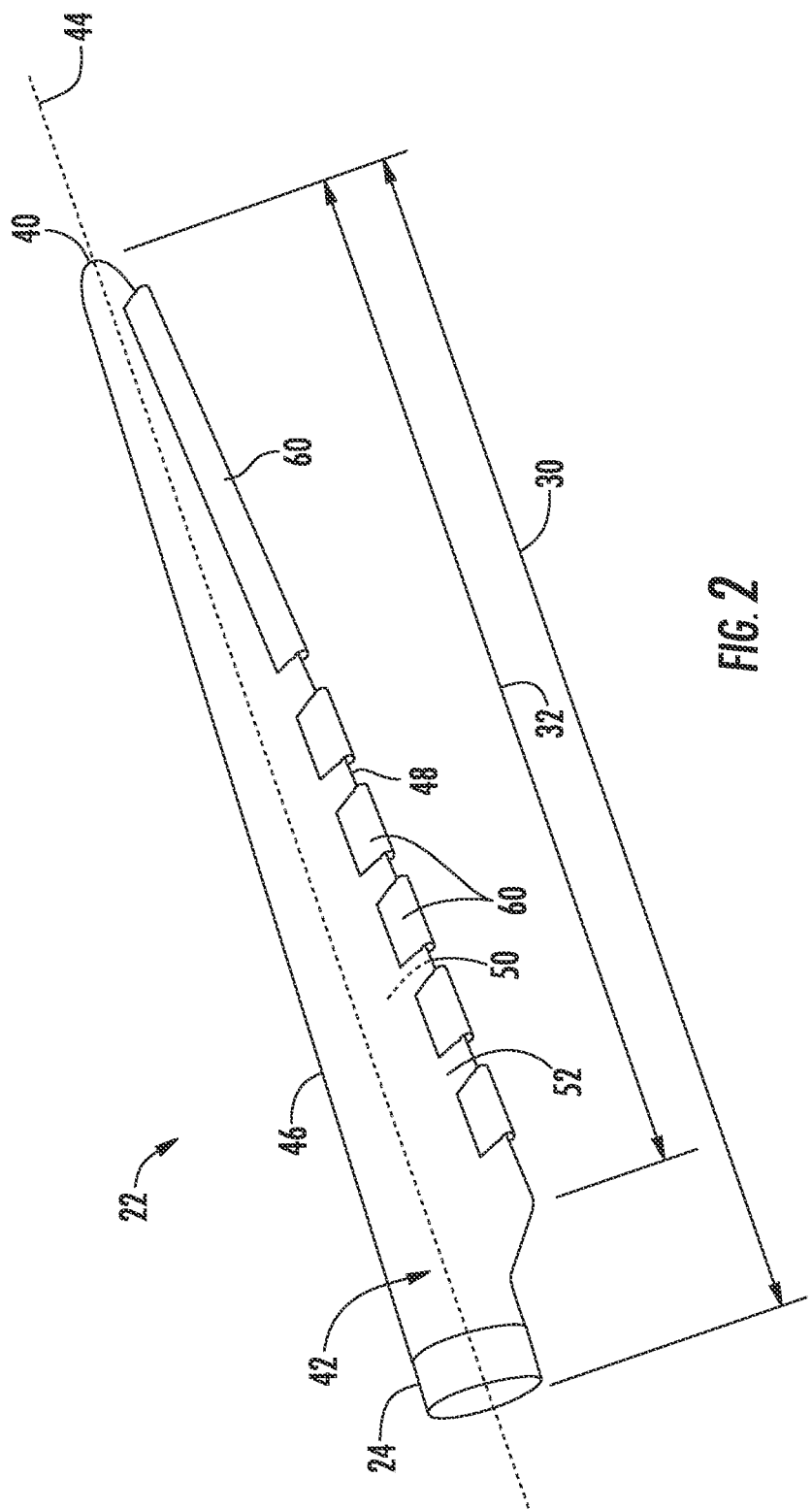
FIG. 2 illustrates a perspective view of a rotor blade of a wind turbine.

Referring now to FIG. 2, a perspective view of a rotor blade 22 is illustrated. As shown, the rotor blade 22 includes a blade root 24 used to mount the rotor blade 22 to the hub 20 (FIG. 1). The rotor blade 22 also includes a blade tip 40 disposed opposite the blade root 24. A blade shell 42 generally extends along a central axis 44 between the blade root 24 and the blade tip 40 and defines a leading edge 46 and a trailing edge 48 of the rotor blade 22. In one embodiment, the blade shell 42 of the rotor bade 22 may be manufactured as a two-piece construction, including a suction side 50 and a pressure side 52. It should be appreciated that each pressure and suction side 50, 52 may generally define a substantially aerodynamic profile. Thus, when combined, the pressure and suction sides 50, 52 form a blade shell 42 having an aerodynamic airfoil shape that enables the rotor blade 22 to capture kinetic energy from the wind using known airfoil principles.

Figure 4:
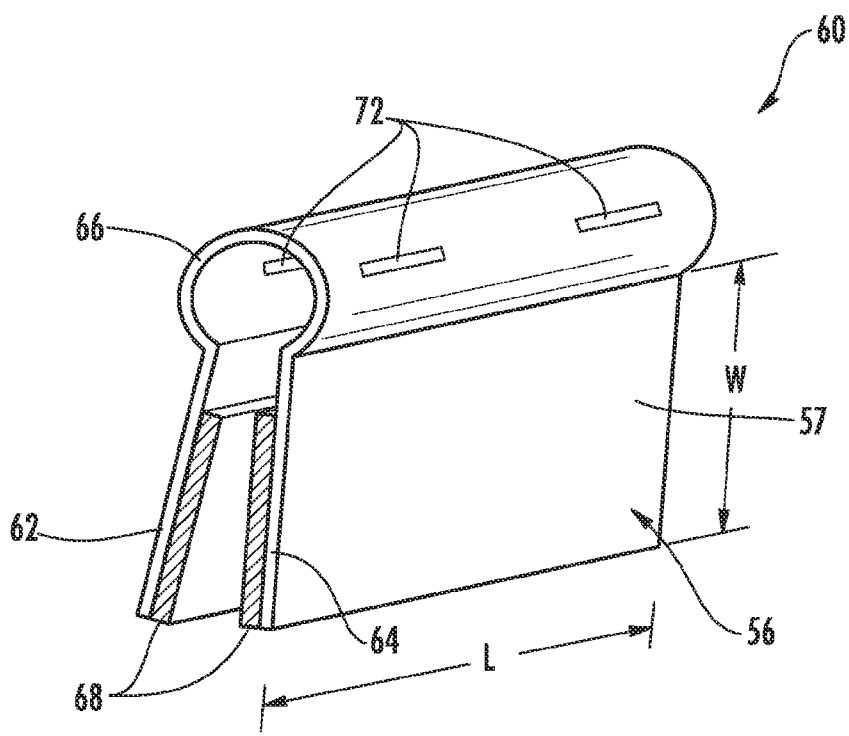
FIG. 4 illustrates a perspective view of a protective cap in accordance with aspects of the present subject matter.

Referring now to FIGS. 2 and 4, one or more protective caps 60 may be employed along the span 30 of the rotor blade 22, or more specifically, along the span-wise length 32 of the trailing edge 48. Further, the protective caps 60 may be installed adjacent to one another or spaced apart a predetermined distance from one another. Moreover, the one or more protective caps 60 may have a longitudinal length L so as to cover at least a portion of the trailing edge 48. For example, as illustrated, five protective caps 60 having a shorter longitudinal length L and one protective cap 60 having a longer longitudinal length L are disposed along the span-wise length 32 of the trailing edge 48 so as to protect substantially the entire trailing edge 48.

In alternative embodiments, the protective cap 60 may be a single protective cap 60 having a longitudinal length L extending substantially the entire span-wise length 32 of the trailing edge 48. Alternatively, the protective cap 60 may extend only a portion of the span-wise length 32 of the trailing edge 48. Additionally, it should be appreciated by those of ordinary skill in the art that the minimum length of the protective cap 60 required to provide sufficient protection to the rotor blade 22 may generally vary depending on, for example, the blade structure, size, and/or the material of the rotor blade 22. As used herein, the term "span-wise" is meant to encompass the direction along the span 30 of the rotor blade 22, whereas the term "chord-wise" is meant to encompass the direction along the chord 26 of the rotor blade 22.

Figure 3:
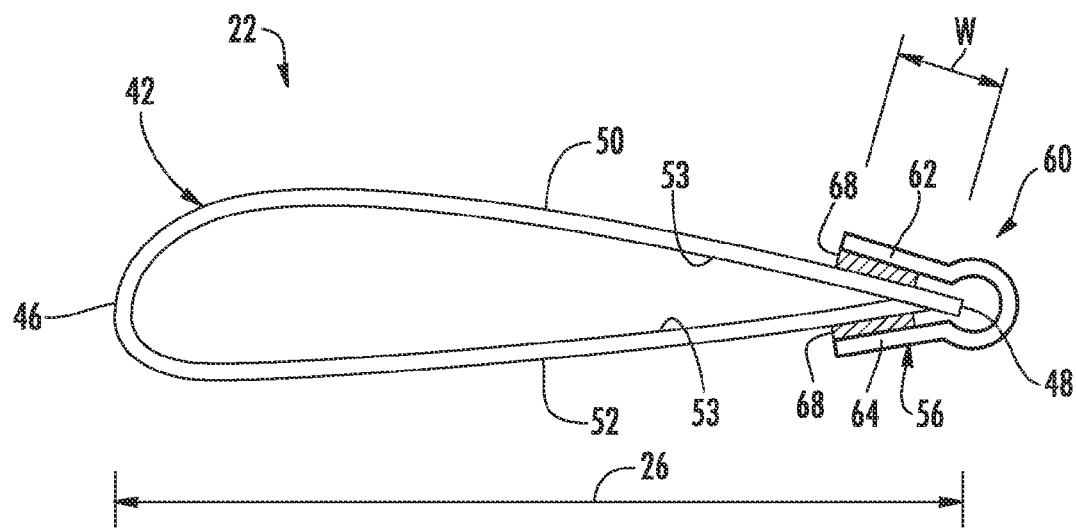
FIG. 3 illustrates a cross-sectional view of a rotor blade with a protective cap installed in accordance with aspects of the present subject matter.

Referring now to FIGS. 3 and 4, another embodiment of the protective cap 60 is illustrated. In particular, FIG. 3 illustrates a cross-sectional view of the rotor blade 22 having the protective cap 60 installed thereon, whereas FIG. 4 illustrates a perspective view of the protective cap 60. As shown, the protective cap 60 may include a rigid body 56 having a first leg 62, a second leg 64, and a cap member 66 connecting the first and second legs 62, 64. The cap member 66 may also provide a gap 70 between an inner surface 78 of the protective cap 60 and the rotor blade 22. For example, as illustrated in FIGS. 3-6, the protective cap 60 is formed such that the cap member 66 has a substantially arcuate shape so as to provide gap 70 between inner surface 78 and the blade 22. In further embodiments, the cap member 66 may have any suitable shape include a circular, square, rectangular, oval, arcuate, annular, or similar. As such, the protective cap 60 covers the trailing edge 48 of the rotor blade 22 during transportation, handling, and/or maintenance, but does not contact or rub the trailing edge 48.

Figure 7:
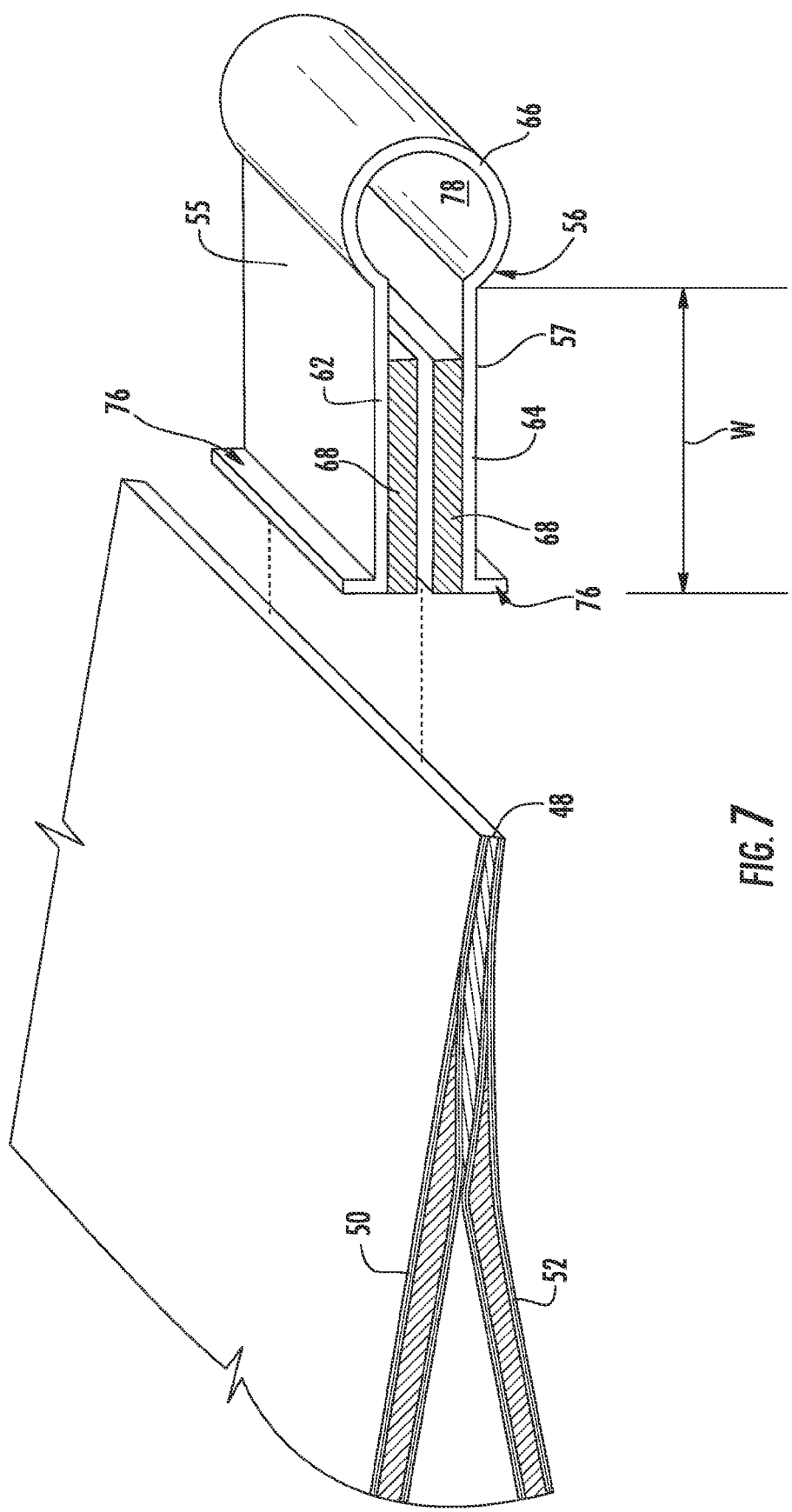
FIG. 7 illustrates an exploded view of the protective cap before it is installed on the rotor blade in accordance with aspects of the present subject matter; and, FIG. 8 illustrates a shipping fixture including a protective cap according to the present disclosure.

Further, the first and second legs 62, 64 of the protective cap 60 may be configured to contact the suction and pressure sides of the rotor blade, respectively. More specifically, as shown in FIG. 7, the first and second legs 62, 64 may be configured to resiliently engage the suction and pressure sides 50, 52, respectively. For example, as shown, the first and second legs 62, 64 may be substantially parallel to one another in an unassembled state. As such, the first and second legs 62, 64 may be separated at an angle when installed on the rotor blade 22 so as to fit around the trailing edge 48. Accordingly, the resistance in the legs 62, 64 effectively holds the protective cap 60 to the blade 22.

In alternative embodiments, the first and second legs 62, 64 may extend at diverging angles in an unassembled state. As such, the first and second legs 62, 64 may be designed according to the shape of the pressure and suction sides 50, 52 such that they fit closely against the respective sides 50, 52 when installed. Accordingly, the protective cap 60 does not add substantial bulk during transportation, handling, or maintenance.

Additionally, the first and second legs 62, 64 may have any suitable surface areas 55, 57. The surface areas 55, 57 are configured to cover a portion of the pressure and suction sides, respectively. For example, as shown in FIGS. 4 and 7, the first and second legs 62, 64 have substantially rectangular surface areas defined by longitudinal length L and width W. Further, the respective surface areas 55, 57 may each be substantially the same shape or may have different shapes. For example, as illustrated in FIG. 4, both of the first and second legs 62, 64 have corresponding rectangular surface areas 55, 57. In alternative embodiments, the surface areas 55, 57 of the first and second legs 62, 64 may be any asymmetrical shapes and/or sizes.

In further embodiments, the width W of the first and second legs 62, 64 may extend approximately 5% to approximately 50% of the chord 26 of the rotor blade 22 as measured from the trailing edge 48 when installed. In still further embodiments, the width W of the first and second legs 62, 64 may extend less than 5% or more than 50% of the chord 26. As shown the illustrated embodiment of FIG. 3, the width W is approximately 10% of the chord 26 as measured from the trailing edge 48.

Figure 6:
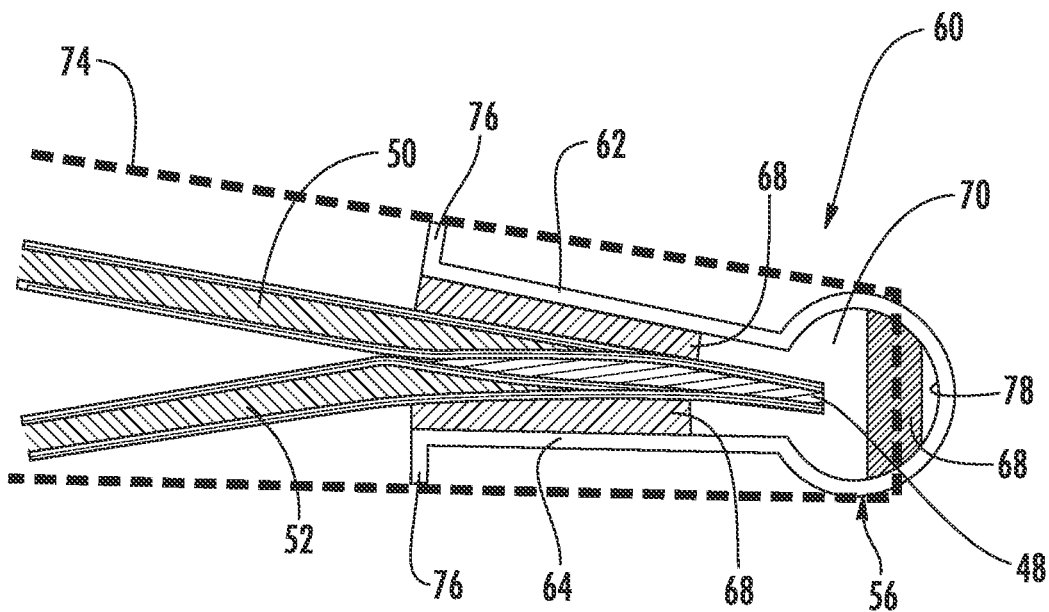
FIG. 6 illustrates another detailed, cross-sectional view of a rotor blade with a protective cap installed in accordance with aspects of the present subject matter.

Referring now to FIG. 6, the first and second legs 62, 64 may also each include a flange 76 extending substantially perpendicular from each leg, respectively. In further embodiments, the first and second legs 62, 64 may include a plurality of flanges 76. Such flange(s) 76 may extend substantially all of or less than all of the longitudinal length L of the first and second legs 62, 64. Moreover, the flange(s) 76 may extend substantially all of or less than all of the width W of the first and second legs 62, 64.

In addition, the flange(s) 76 may extend any suitable perpendicular length from the first and second legs 62, 64. As such, the flange(s) 76 may engage a fastening component(s) 74 (described in more detail below) such that the protective cap 60 remains in proper contact with the rotor blade, but where the flange 76 also prevents the fastening component(s) 74 from contacting the rotor blade 22. In still additional embodiments, the flange(s) 76 may be any suitable shape. For example, as illustrated, the flanges 76 have a substantially rectangular shape, however, in further embodiments, the flanges 76 may be any suitable shape, such as a pointed or rounded shape.

The protective cap 60 may also include one or more cushion pads 68 disposed within the protective cap 60 to further protect the blade shell 42. For example, as illustrated in FIGS. 3-6, at least one cushion pad 68 may be disposed between the first leg 62 and the suction side 50 and at least one cushion pad may be disposed between the second leg 64 and the pressure side 52. Such cushion pads 68 may extend the entire longitudinal length L and width W of the first and second legs 62, 64, or may extend only a portion of the longitudinal length L and width W. In addition, the protective cap 60 may include at least one cushion pad 68 between the cap member 66 and the trailing edge 48 of the rotor blade 22. For example, as shown in FIG. 6, the cushion pad 68 is located between the cap member 66 and the trailing edge 48 of the blade 22. As such, if the rotor blade 22 moves or slides during transportation, handling, or maintenance, then the trailing edge 48 will contact the cushion pad(s) 68 within the cap member 66 instead of the protective cap 60 itself By providing cushions pads 68 as described herein, the protective cap 60 is not required to contact any portion of the rotor blade 22 directly; rather, the blade 22 may be contacted by the cushion pads 68 only. Such a configuration provides enhanced protection for the rotor blade 22 during transportation, handling, or maintenance of the rotor blade.

It should also be understood that the cushion pads 68 may be located anywhere within or outside of the protective cap 60. Further, the cushion pads 68 may have any suitable shape or thickness. For example, in one embodiment, the cushion pads 68 may have a shape that corresponds to the shape of the first and second legs 62, 64. Further, it should be understood that the cushion pads 68 may be installed within the protective cap 60 using any suitable means. For example, the cushion pads 68 may be installed using any suitable adhesive tape or glue or may be frictionally-enhanced such that they are friction fit between the rotor blade 22 and the protective cap 60.

Figure 5:
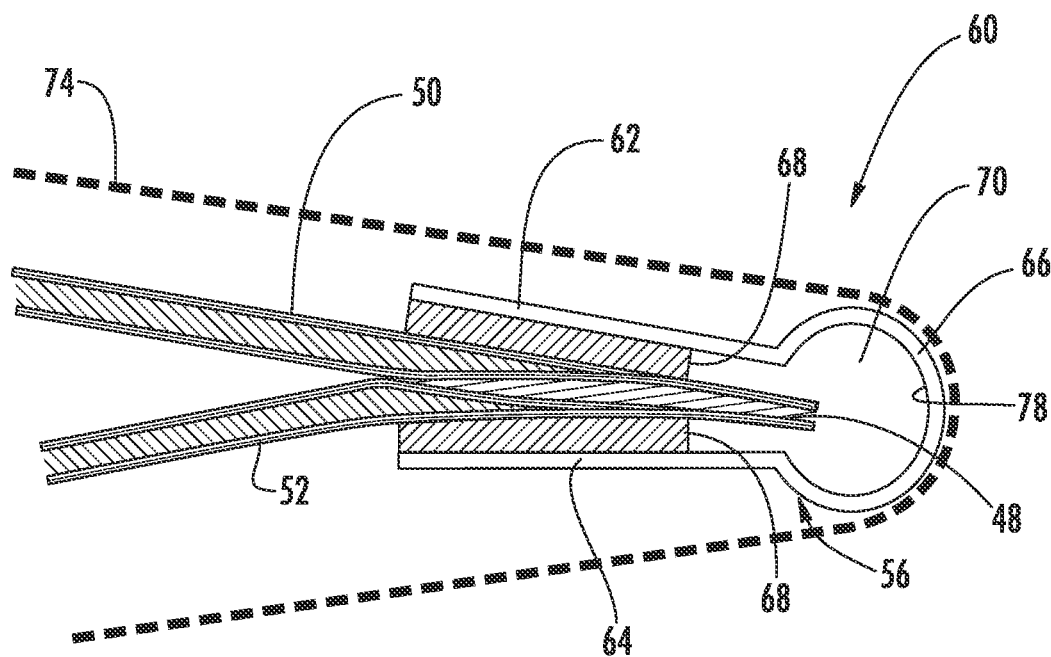
FIG. 5 illustrates a detailed, cross-sectional view of a rotor blade with a protective cap installed in accordance with aspects of the present subject matter.

Referring still to FIGS. 4-6, the protective cap 60 may also include one or more slots 72 configured to receive the one or more fastening components 74 (i.e. straps, slings, chains, or similar) for assisting with transporting and/or handling the blade. More specifically, the slots 72 may be spaced along the longitudinal length L of the cap member 66 such that the fastening component(s) 74 may be inserted on one side of the cap member 66 and may exit on an opposite side of cap member 66. As such, the fastening component(s) 74 are configured to fit around the protective cap 60 and the rotor blade 22 in a chord-wise direction when the protective cap 60 is installed on the rotor blade 22. Such a configuration further secures the protective cap 60 on the rotor blade 22 to avoid longitudinal slippage between the cap 60 and the rotor blade 22 during transportation and/or handling. Further, providing the fastening component(s) 74 within the slots 72 avoids misplacement of the fastening component(s) 74 during transportation and/or handling.

In alternative embodiments, the protective cap 60 may not include any slots 72, as shown in FIG. 5. As such, the fastening component(s) 74 may be installed around the protective cap 60 such that the shape of the cap member 66 and/or the flanges 76 prevents the fastening component(s) 74 from contacting the rotor blade 22. In still further embodiments, an external handling mechanism may also be employed to assist in securing the protective cap 60 to the rotor blade 22. For example, the external handling mechanism may consist of a clamp, adhesive, or similar. Such an external handling mechanism may further ensure that the protective cap 60 will remain in place during transportation, handling, or maintenance of the rotor blade 22.

Figure 8:
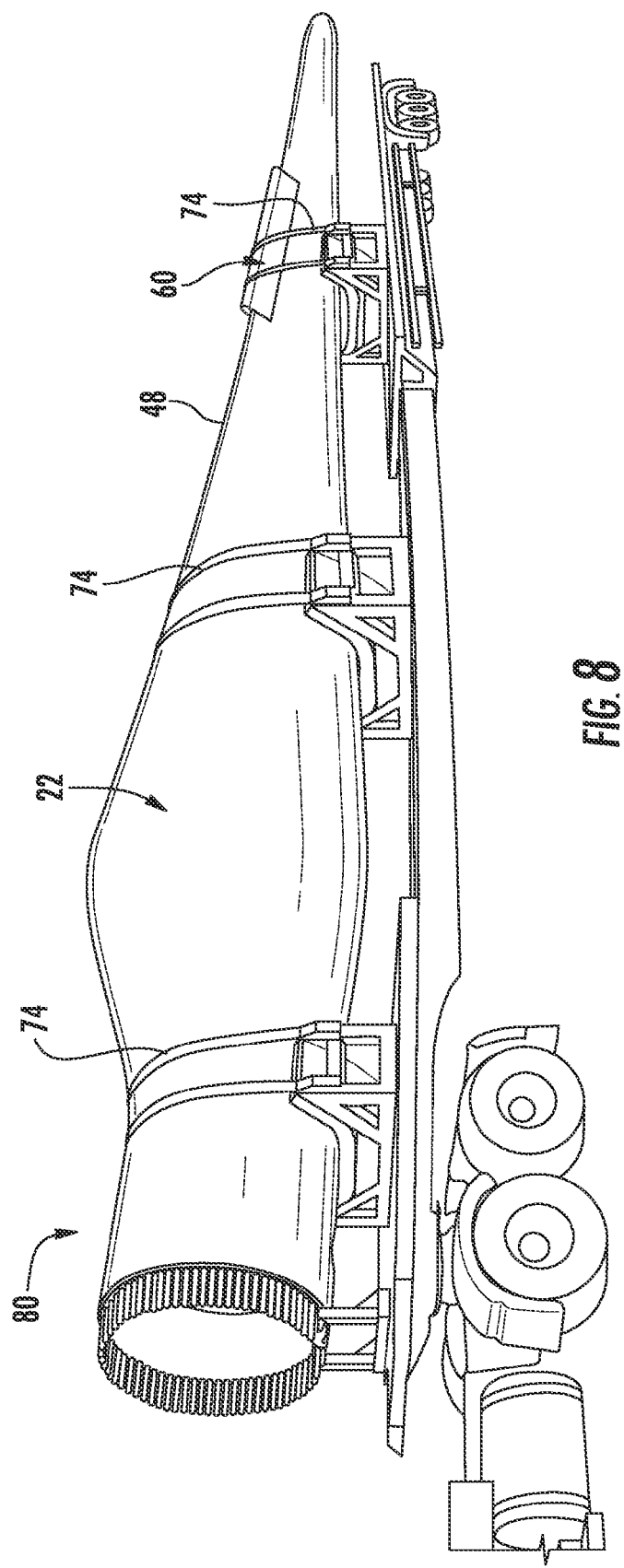

In another embodiment, the protective cap 60 may also be a part of a larger shipping fixture 80. As such, as shown in FIG. 8, the fastening component(s) 74 may also be used to secure the rotor blade 22 to the shipping fixture 80. As such, the fastening component(s) 74 may also be integral with the shipping fixture 80 or may be attached to the shipping fixture 80 as a separate feature. As mentioned, providing fastening component(s) 74 that are integral with the shipping fixture and/or protective cap 60 avoids misplacement of the fastening component(s) 74 during transportation and/or handling. For example, in one embodiment, the fastening component(s) 74 may be attached to the shipping fixture 80 by directly strapping the fastening component(s) 74 to the shipping fixture 80. The fastening component(s) 74 may also be used to connect the shipping fixture 80 to truck, railcar, or similar, during transportation, handling, and/or maintenance.

Referring still to FIG. 8, the shipping fixture 80 may be configured to support the rotor blade 22 having a protective cap 60 secured to it by at least one fastening component 74. The illustrated protective cap 60 may be configured with any of the features as described herein. Further, the rotor blade 22 having the protective cap 60 installed thereon is typically designed to have maximum dimensions equal to or less than maximum dimensions permitted for rail or truck transport.

In additional embodiments, the protective cap 60 may be formed from any rigid material that provides a suitable stiffness. For example, the protective cap 60 may be any isotropic (e.g. aluminum) or anisotropic (e.g. fiberglass/epoxy composite) material or a combination thereof. As such, the protective cap 60 may be very lightweight and have a high strength/stiffness. Further, the material of the protective cap 60 may have the desired strength, stiffness, and mass to maintain the necessary engagement with the pressure and suction sides 50, 52. Moreover, the protective cap 60 may provide improved protection of the trailing edge 48 throughout the range of anticipated loading scenarios generally associated with handling and transporting the blade 22. Of course, it should be appreciated that various other suitable metals or non-metals may be used to form the protective cap 60 of the present subject matter and those described herein are not meant to be limit the present disclosure.

Additionally, any suitable machining processes may be used to form the protective cap 60 in order to provide the desired shape and thickness. Further, the protective cap 60 may be fabricated using any suitable means known in the art, such as, for example, molding, forming, and/or welding.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A protective cap for a trailing edge of a rotor blade of a wind turbine for use during transportation, handling, or maintenance of the rotor blade, said protective cap comprising:

a body having a first leg and a second leg connected by a cap member, wherein said cap member is integral with said first and second legs, said cap member configured to cover at least a portion of the trailing edge of the rotor blade when said protective cap is installed on the rotor blade, wherein said first leg is configured to resiliently engage a suction side of the rotor blade and said second leg is configured to resiliently engage a pressure side of the rotor blade such that the protective cap effectively holds itself on the rotor blade when installed.

2. The protective cap of claim 1, wherein said cap member is configured to provide a gap between an inner surface of said protective cap and the trailing edge of the rotor blade when said protective cap is installed on the rotor blade.

3. The protective cap of claim 1, wherein said first and second legs each comprise a surface area, wherein said surface areas cover a portion of a pressure side and a suction side of the rotor blade.

4. The protective cap of claim 1, wherein the first and second legs each comprise at least one flange extending substantially perpendicular therefrom.

5. The protective cap of claim 1, wherein said first leg is configured to correspond to a profile of said suction side of the rotor blade, and wherein said second leg is configured to correspond to a profile of a pressure side of the rotor blade.

6. The protective cap of claim 2, further comprising at least one cushion pad between said first leg and said suction side and at least one cushion pad between said second leg and said pressure side.

7. The protective cap of claim 1, further comprising at least one cushion pad between said cap member and said trailing edge of the rotor blade.

8. The protective cap of claim 3, wherein said protective cap extends substantially the span-wise length of the trailing edge.

9. The protective cap of claim 3, wherein said protective cap extends a portion of the span-wise length of the trailing edge.

10. The protective cap of claim 1, wherein the cap member comprises a substantially arcuate shape.

11. The protective cap of claim 1, wherein the protective cap further comprises a fastening component configured to secure the protective cap to the rotor blade.

12. The protective cap of claim 11, wherein the cap member further comprises at least one slot configured to receive the fastening component, wherein said fastening component comprises one of a strap, a sling, or a chain.

13. A protective cap for a trailing edge of a rotor blade of a wind turbine for use during transportation, handling, or maintenance of the rotor blade, said protective cap comprising:
 a body having a first leg and a second leg connected by a cap member, the cap member being intergral with said first and second legs, said cap member configured to cover at least a portion of the trailing edge of the rotor blade when said protective cap is installed on the rotor blade,
 wherein said cap member is configured to provide a gap between an inner surface of said protective cap and the trailing edge when said protective cap is installed on the rotor blade, and
 wherein said first and second legs resiliently engage the rotor blade.

14. The protective cap of claim 13, wherein said first leg is configured to resiliently engage a suction side of the rotor blade, and wherein said second leg is configured to resiliently engage a pressure side of the rotor blade.

15. The protective cap of claim 13, wherein said first and second legs each comprise a surface area, and wherein each surface area comprises at least one flange extending substantially perpendicular therefrom.

16. A method for preparing a rotor blade for transportation, handling, or maintenance, the method comprising:
 installing at least one protective cap on a trailing edge of the rotor blade, the protective cap comprising a body having a first leg and a second leg connected by a cap member, said cap member being integral with said first and second legs, and wherein said first and second legs resiliently engage the rotor blade; and,
 securing the protective cap to the rotor blade, wherein said cap member provides a gap between an inner surface of said protective cap and the trailing edge of the rotor blade when said protective cap is secured to the rotor blade.

17. The method of claim 16, further comprising installing at least one cushion pad between said first and second legs of the protective cap and said rotor blade.

18. The method of claim 16, wherein securing the protective cap to the rotor blade further comprises securing at least one fastening component to the protective cap and the rotor blade, wherein the fastening component comprises one of a strap, a sling, or a chain.

19. The method of claim 18, further comprising installing the at least one fastening component within at least one slot of the protective cap.

20. The method of claim 16, further comprising installing the rotor blade comprising the installed protective cap within a shipping fixture, the shipping fixture being designed to have maximum dimensions equal to or less than maximum dimensions permitted for rail or truck transport.

* * * * *